ABSTRACT OF THE DISCLOSURE

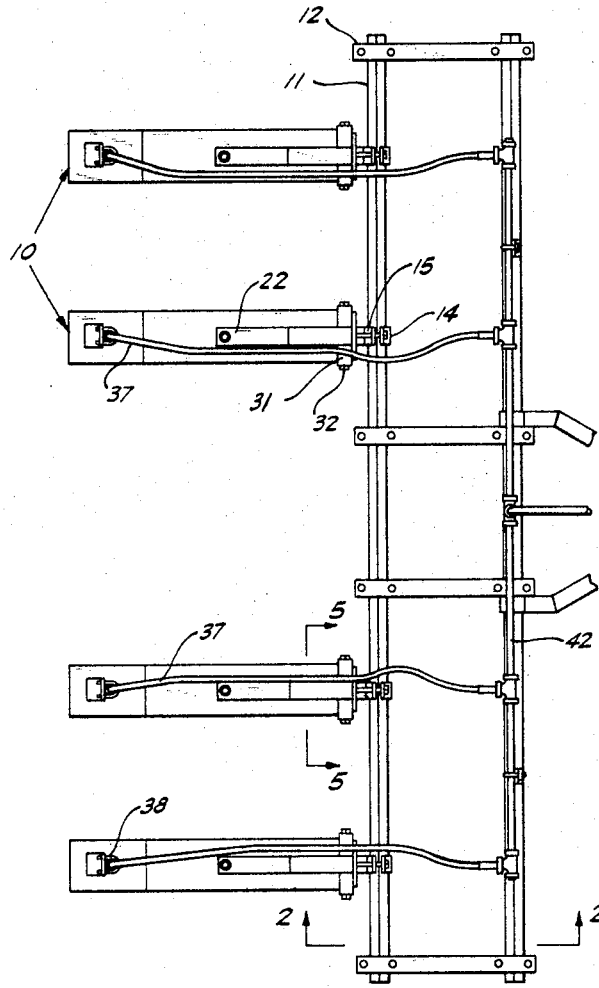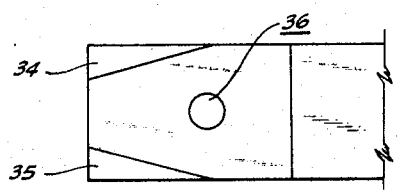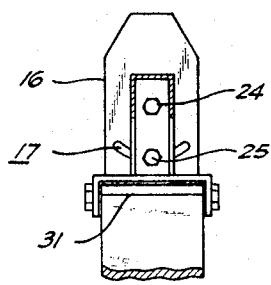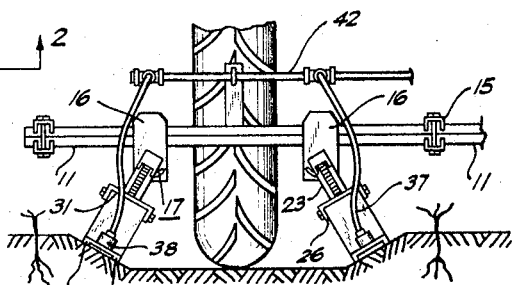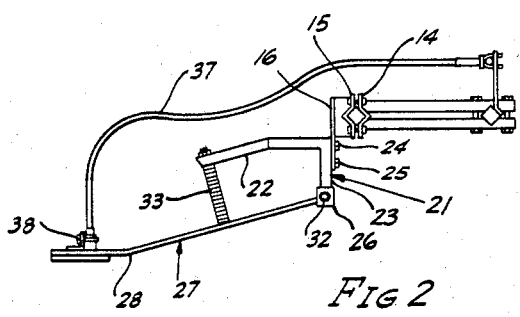
April 1, 1969     B. A. HARBOLT     3,435,785
FERTILIZER APPLICATOR AND PROCESS
Filed April 19, 1967
INVENTOR.
BRUCE A. HARBOLT
BY
ATTORNEY 3,435,785
FERTILIZER APPLICATOR AND PROCESS
Bruce A. Harbolt, Los Angeles, Calif., assignor to Union Oil Company of California, Los Angeles, Calif., a corporation of California
Filed Apr. 19, 1967, Ser. No. 631,988
Int. Cl. A01c 23/02; B05b 1/20
U.S. Cl. 111—6                          5 Claims

Equipment and process for injecting fertilizer into the ground under high pressure by application from a point on the ground surface.

---

This invention relates to an agricultural injection device and more specifically to a device suitable for injecting liquid fertilizers under high pressure below the surface of the ground.

The application of liquids to the soil for agricultural purposes falls into two general classes, namely spraying from above the ground and subsurface injections. The spraying of fertilizer has generally proved inefficient because the spray tends to be blown away or evaporated and also does not get a chance to penetrate into the ground to contact the feeder root systems of the plants. Consequently, the present trend is towards devices and methods for injecting agricultural liquids below the surface of the ground. This latter method minimizes evaporation and enables the liquids to be applied in the immediate vicinity of the roots to be fertilized. Such prior art processes and devices are disclosed in U.S. Patents 1,871,529, 2,930,334, 3,012,526, 3,025,806 and U.S. Reissue Patent 25,307.

Heretofore, the most common method of applying liquid fertilizer below the ground has been by means of a shank which penetrates several inches into the ground and creates a narrow channel into which the fertilizer is applied. The use of a shank has many disadvantages. For one thing, as it travels through the ground it may contact and disseminate fungus patches along its path and also may contact and break up root systems of the plants to be fertilized. In addition, use of a shank produces a high drag on the tractor or other conveyor and this in turn slows down the tractor besides imposing a heavy load on the tractor motor. If an uneven load is imposed on the shanks during the injection, the tractor tends to be pulled out of line and this may cause the shanks to be pulled across a row of plants resulting in their destruction or it may cause an improperly aligned application of fertilizer. Use of a shank also reduces the width which can be covered because of the drag effect. Other drawbacks are the maintenance costs, such as hard facing the shank plus the time lost while these maintenance operations are carried out.

With this background in mind, an object of the invention is to provide an apparatus and method for injecting agricultural liquids into the ground at high pressure.

Another object is to provide an apparatus and method for injecting agricultural liquids into the ground at high pressure from a point adjacent the ground surface thereby eliminating the use of a shank.

Another object is to provide an apparatus for injecting agricultural liquids into the ground at adjustable angles.

Another object is to provide an apparatus for injecting into the ground agricultural liquids which are of either high or low volatility.

Another object is to provide an apparatus which permits fertilizing to be carried out at an early stage of plant development without disturbing plant root systems.

Another object is to reduce the horsepower of the conveyor or tractor which is required to move the fertilizer injector apparatus.

Another object is to minimize evaporation losses of fertilizer from the ground.

Other objects of the invention will become apparent from the description to follow and the drawings.

FIGURE 1 is a plan view showing the injector sleds of this invention attached to a mounting carried by a tractor or other conveyor.

FIGURE 2 is a side elevation of an individual injector sled taken along lines 2—2 of FIGURE 1.

FIGURE 3 is a plan view of the bottom portion of an injector sled.

FIGURE 4 is an end elevation of injectors positioned over a mound shaped planted strip of ground.

FIGURE 5 is an end elevation of the sled adjustment taken along lines 5—5 of FIGURE 1.

In the drawings the injectors 10 of the present invention are shown attached to a mounting bar 11 of a vertically adjustable frame 12 carried by a tractor or other vehicle. The injector includes brackets 14 and 15 which are bolted to the mounting bar. The rear portion of bracket 15 provides a downwardly extending plate 16 having an arcuate guide slot 17 at its lower end.

An L bar 21 having a bent, outwardly extending, horizontal tension arm 22 and a vertical arm 23, is attached to the plate 16 by bolts 24 and 25. Bolt 24 extends through the body of the plate 16 while bolt 25 extends through the slot 17 of the plate. When the two bolts are loosened, the upper part of the vertical arm 23 can be rotated about bolt 24, while the lower part of the vertical arm is rotated with bolt 25 guided along the slot 17. The end of the vertical arm 23 terminates in a fork 26.

A sled 27 having an elongate body 28 and a bifurcated end 31 is rotatably mounted with its end around a bolt 32 mounted across the fork. A spring 33 is mounted between the horizontal arm 22 and the body 28 to maintain the sled against the soil surface as the sled or tractor travels over uneven ground. The spring also biases the sled downwardly against the upward force of the injection stream. Since only a small area of the sled actually contacts the ground, the pressure applied by the spring to this area is very high.

FIGURE 3 shows the end portion of the sled which provides two inclined plates 34 and 35 mounted on the underside of the body at the end of the sled. The plates are spaced horizontally from each other and are inclined inwardly towards the end of the sled. An injection nozzle 36 is provided on the sled between the plates, and a high pressure injector hose 37 is attached to the nozzle; a clamp 38 mounted on the sled maintains the hose secured and permits the nozzle to be raised or lowered a short distance on the sled. An agricultural liquid such as fertilizer is supplied from a tank through a high pressure pump into a manifold pipe 42. A suitable pump is a Triplex-3 plunger positive displacement high pressure pump. It can be purchased from the Union Pump Company, John Bean Division of the FMC Corporation and Kobe Pump Company. Each of the injectors are fed from the manifold pipe through the connecting injector hoses. If desired, a nematocide, insecticide, fungicide, etc. may be used alone or admixed with the liquid fertilizer. The types of fertilizer liquid which may be employed are widely varied and include 20% aqueous ammonia, ammonium nitrate solution, ammonium phosphate solution, complete NPK liquid mix solutions, etc.

In operation, the frame 12 is lowered over the area to be fertilized, so that the plates 34, 35 on the sled body 28 are biased onto the ground surface by the spring 33, as shown in FIGURE 4. Liquid is applied under pressure through the hose 37 and the liquid is injected through the nozzles 36 into the ground. The depth of penetration is governed principally by the ejection pressure, nozzle size, and permeability of the ground. Suitable nozzle dimensions, ejection pressures and other important parameters are set out in detail in U.S. Reissue Patent 25,307.

As the sled is dragged along the ground, the inclination of plates 34 and 35 causes earth on either side of the nozzle 36 to be compressed into the trailing end of the plates; this compressed earth will cover and seal the slit left by the liquid trail and thereby reduce evaporation losses. When fertilizing over a flat narrow planted strip, brackets 14 and 15 are adjusted along the mounting bar 11 so that the injectors conform to the width of the strip. If the planted strip is mound shaped, as shown in FIGURE 4, the vertical arm 23 of L bar 21 can be rotated about bolt 24 and along slot 17 so that liquid is injected into the sides of the planted strip at an angle. This permits the spray to be directed accurately along the outer sides of the strip towards the feeder roots of the plants.

The present device has numerous advantages over prior art injectors and sprayers. Besides having no moving parts, it is extremely simple and rugged and can be employed either in direct contact with the ground or at a short distance therefrom. Little drag is produced when using the present injectors and consequently the agricultural liquid can be applied much more quickly and over a much wider swath. Less wear and tear is imposed on the tractor, less fuel is required, and the horsepower requirements of the tractor can be reduced by about one half. The application is extremely even because there are no shanks to produce variations in drag, and this also enables the operator to drive the tractor with much less effort. When the injector sleds are positioned in contact with the ground surface, evaporation losses are minimized because the plates 34 and 35 apply a light ground cover over the trail of liquid application causing it to be sealed.

When employing a shank to inject a systemic insecticide, the application must be made at an early stage of the plant development to avoid uprooting or causing injury to the plant. Since the insecticide has a relatively short life in the soil before it dissipates, the growth period during which the plant is protected is not at the optimum. Using the applicator sled of the present invention, the insecticide can be applied at a later stage of plant development without injury to the plant and thereby providing protection during a more critical period of growth development.

I claim:

1. An apparatus for injecting liquid fertilizer into the ground under high pressure comprising: a vertically movable holder; a plate downwardly dependent from said holder; an outwardly extending tension bar carried by said plate; a holder positioned beneath the tension bar; a sled rotatably mounted on the holder, the sled providing an injection nozzle; means to convey liquid fertilizer under high pressure to the nozzle; and a spring positioned between the tension bar and sled, the spring adapted to bias the sled at the nozzle downwardly in close contact with the ground when the holder is lowered.

2. An apparatus for injecting liquid fertilizer into the ground under high pressure comprising: a vertically movable holder; a plate downwardly carried by the holder, the plate providing a guide slot; a tension bar mounted on the plate and adapted for rotation on its base along the guide slot, the tension bar extending outwardly at the upper end and having a holder at the lower end; a sled rotatably mounted about the holder, the sled providing an injection nozzle; means to convey liquid fertilizer under high pressure to the nozzle; and a spring positioned between the outward extension of the tension bar and sled, the spring adapted to bias the sled at the nozzle downwardly into close contact with the ground when the holder is lowered.

3. An apparatus for injecting fertilizer into the ground under high pressure comprising: a vertically movable holder; a plate downwardly carried by the holder, the plate providing a guide slot; a tension bar mounted on the plate and adapted for rotation along the guide slot, the tension bar extending outwardly at the upper end and having a holder at the lower end; a sled rotatably mounted about the holder, the sled providing an injection nozzle; plates provided on the underside of the sled and adapted to seal the trail of liquid fertilizer with earth; means to convey liquid fertilizer under high pressure to the nozzle; and a spring positioned between the tension bar and sled, the spring adapted to bias the sled at the nozzle downwardly into close contact with the ground when the holder is lowered.

4. The apparatus of claim 3 in which the nozzle is located midway between the sides of the sled and the plates are positioned at either side of the sled and behind the nozzle.

5. The apparatus of claim 1 in which a portion of said sled is bent upwardly adjacent the injection nozzle, so that only a trailing portion is in contact with the ground.

References Cited

UNITED STATES PATENTS

| | | | |
|---|---|---|---|
| 2,515,317 | 7/1950 | Schindler | 111—7 |
| 2,988,025 | 6/1961 | Johnston | 111—6 |
| 3,012,526 | 12/1961 | Baldwin et al. | 111—6 |

ROBERT E. BAGWILL, *Primary Examiner.*

U.S. Cl. X.R.

239—159